(12) United States Patent
Liang et al.

(10) Patent No.: US 10,505,583 B2
(45) Date of Patent: Dec. 10, 2019

(54) CROSSTALK CHANNEL ESTIMATION FOR LEGACY CPE

(71) Applicant: Futurewei Technologies, Inc., Plano, TX (US)

(72) Inventors: Haixiang Liang, Atherton, CA (US); Yujie He, Shenzhen (CN); Jianping Tu, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 40 days.

(21) Appl. No.: 15/410,131

(22) Filed: Jan. 19, 2017

(65) Prior Publication Data

US 2018/0175908 A1  Jun. 21, 2018

Related U.S. Application Data

(60) Provisional application No. 62/436,219, filed on Dec. 19, 2016.

(51) Int. Cl.
*H04B 3/32* (2006.01)
*H04B 5/00* (2006.01)
(Continued)

(52) U.S. Cl.
CPC .......... *H04B 3/32* (2013.01); *H04L 25/03343* (2013.01); *H04L 27/2626* (2013.01)

(58) Field of Classification Search
CPC .............................. H04B 3/32; H04L 5/0048
See application file for complete search history.

(56) References Cited

U.S. PATENT DOCUMENTS 8,559,547 B2 * 10/2013 Nuzman ............... H04B 3/487
                                                        370/201
9,900,049 B2 *  2/2018 Kerpez .................. H04B 3/32
(Continued)

FOREIGN PATENT DOCUMENTS

CN       101645754 A       2/2010
CN       103125104 A       5/2013
(Continued)

OTHER PUBLICATIONS

"International Application Serial No. PCT/CN2017/117231, International Search Report dated Feb. 23, 2018", 4 pgs.

(Continued)

*Primary Examiner* — Kevin C. Harper
*Assistant Examiner* — Henry Baron
(74) *Attorney, Agent, or Firm* — Schwegman Lundberg & Woessner, P.A.

(57) ABSTRACT

A digital subscriber line (DSL) network device for coupling to DSL communication lines, the network device comprising: multiplexing circuitry that transmits signals to vector-compliant consumer premises equipment (CPE) and legacy CPE via the DSL communication lines; and processing circuitry configured to: initiate transmission of a predetermined set of orthogonal pilot sequences to a plurality of vector-compliant CPEs; initiate transmission of data symbols corresponding to the set of orthogonal pilot sequences to one or more legacy CPEs; pre-process line errors of a victim vector-compliant CPE to remove far-end crosstalk due to the vector compliant disturber lines and perform the same pre-processing for the transmitted data symbols; determine far-end channel crosstalk information using a correlation of the pre-processed line errors and the pre-processed transmitted data symbols; and reduce far-end channel cross- (Continued)

talk of the victim vector-compliant CPE using the determined far-end channel crosstalk information.

22 Claims, 4 Drawing Sheets

(51) Int. Cl.
 *H04L 25/03* (2006.01)
 *H04L 27/26* (2006.01)

(56) References Cited

U.S. PATENT DOCUMENTS

| | | | |
|---|---|---|---|
| 9,967,124 B2* | 5/2018 | Thomas | H04L 27/2636 |
| 2008/0188185 A1* | 8/2008 | Shi | H04L 5/0007 |
| | | | 455/67.13 |
| 2009/0310502 A1 | 12/2009 | Nuzman et al. | |
| 2012/0020418 A1 | 1/2012 | Sands et al. | |
| 2014/0140187 A1* | 5/2014 | Wang | H04B 3/32 |
| | | | 370/201 |
| 2014/0185659 A1 | 7/2014 | Cassiers et al. | |
| 2015/0163350 A1 | 6/2015 | Shi | |

FOREIGN PATENT DOCUMENTS

| | | |
|---|---|---|
| CN | 103828251 B | 6/2016 |
| EP | 3062448 A1 | 8/2016 |
| WO | WO-2016/061254 A1 | 4/2016 |

OTHER PUBLICATIONS

"International Application Serial No. PCT/CN2017/117231, Written Opinion dated Feb. 23, 2018", 5 pgs.
"European Application No. 17883547.6, Extended European Search Report dated Aug. 9, 2019", (Aug. 9, 2019), 9 pgs.
Vector, G., "A Backward-Compatible Crosstalk Channel Estimation Method for Downstream Vectoring; BF-065", ITU-T Draft; Study Period 2005-2008, International Telecommunication Union, Geneva; CH, vol. 4/15, Dec. 3, 2007, pp. 1-9, XP017532093, (Dec. 3, 2007), 9 pgs.

* cited by examiner

CROSSTALK CHANNEL ESTIMATION FOR LEGACY CPE

CLAIM OF PRIORITY

This application claims the benefit of priority of U.S. Provisional Application No. 62/436,219, filed Dec. 19, 2016, which is hereby incorporated herein by reference in its entirety.

FIELD OF THE INVENTION

The present disclosure is related to digital subscriber line (DSL) technology, and in particular to vectored DSL technology intended to reduce or eliminate crosstalk in DSL communication lines.

BACKGROUND

Figure 1:
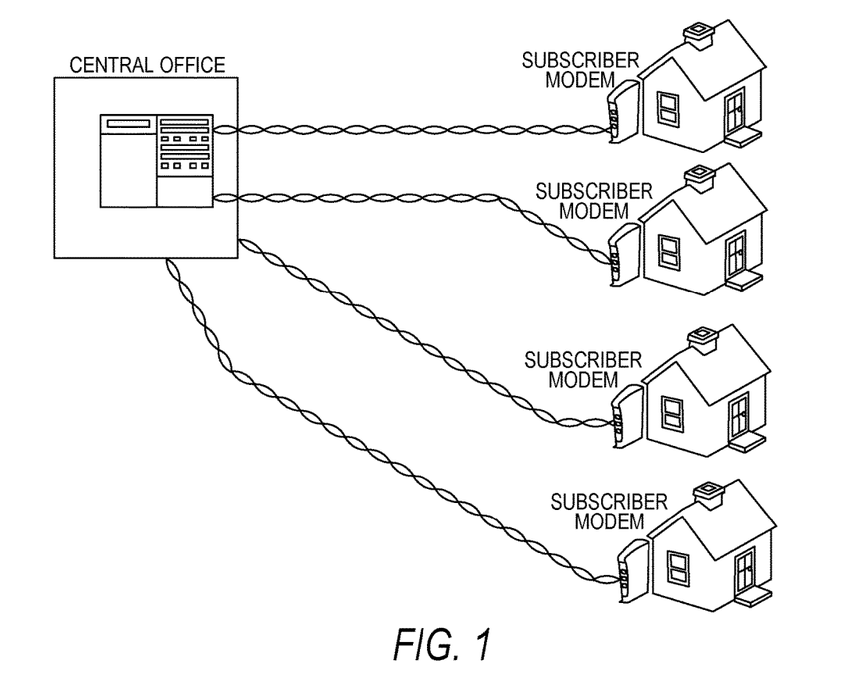
FIG. 1 is an illustration of an example DSL system.

DSL technology is used to transmit digital data over telephone lines for internet access. FIG. 1 is an illustration of an example DSL system. A router at the central office (CO) transmits signals over phone lines to consumer premises equipment (CPE). The phone lines are typically insulated copper wires and are often bundled together. The demand for increased functionality in DSL systems has led to requirements for increased bandwidth in DSL technology. However, bandwidth of DSL technology is limited due to crosstalk at the higher frequencies used to transmit digital data over the phone lines. Thus, there are general needs to provide robust DSL communication at high data rates.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

Example 1 includes subject matter (such as a digital subscriber line (DSL) network device for coupling to DSL communication lines) comprising multiplexing circuitry and processing circuitry. The multiplexing circuitry is configured to transmit signals to vector-compliant consumer premises equipment (CPE) and legacy CPE devices via the DSL communication lines. The processing circuitry is configured to: initiate transmission of a predetermined set of orthogonal pilot sequences to one or more disturber vector-compliant CPEs; initiate transmission of data symbols corresponding to the set of orthogonal pilot sequences to one or more disturber legacy CPEs; pre-process line errors of a victim vector-compliant CPE, due to the transmitting of the predetermined set of orthogonal pilot sequences, to remove the far-end crosstalk due to the vector compliant disturber lines and perform the same pre-processing for the transmitted data symbols; determine far-end channel crosstalk information between network device ports connected to the one or more disturber legacy CPEs and a network device port connected to the victim vector-compliant CPE using a correlation of the pre-processed line errors and the pre-processed transmitted data symbols; and reduce far-end crosstalk of the victim vector-compliant CPE using the determined far-end channel crosstalk information.

In Example 2, the subject matter of Example 1 optionally includes processing circuitry configured to pre-code subsequent signals to transmit via the one or more disturber vector-compliant CPEs using an inverse of an estimated far-end channel crosstalk signal.

In Example 3, the subject matter of one or both of Examples 1 and 2 optionally includes processing circuitry configured to transmit a pilot sequence of all ones to all vector-compliant CPEs and transmitting data symbols corresponding to the pilot sequence of all ones to all legacy CPEs, and pre-process the line errors by determining a difference between every two adjacent synchronization (SYNC) symbol errors and every two adjacent data symbols for a channel of the victim vector-compliant CPE.

In Example 4, the subject matter of one or any combination of Examples 1-3 optionally includes processing circuitry configured to transmit a pilot sequence of alternating ones and zeros to all vector-compliant CPEs and transmit data symbols corresponding to the pilot sequence of alternating ones and zeros to all legacy CPEs, and pre-process the line errors by determining a sum between every two adjacent SYNC symbol errors and every two adjacent data symbols for a channel of the victim vector-compliant CPE.

In Example 5, the subject matter of one or any combination of Examples 1-4 optionally includes processing circuitry configured to transmit a specified pilot sequence twice in succession to the disturber vector-compliant CPEs and transmit data symbols corresponding to the specified pilot sequence twice in succession to the disturber legacy CPEs, and pre-process the line errors by determining a difference between every two SYNC symbol errors corresponding to the two instances of the pilot sequence and data symbols corresponding to the two instances of the pilot sequence for a channel of the victim vector-compliant CPE.

In Example 6, the subject matter of one or any combination of Examples 1-5 optionally includes processing circuitry configured to transmit each bit of a specified pilot sequence twice in succession to the disturber vector-compliant CPEs and transmit data symbols corresponding to each bit of the specified pilot sequence twice in succession to the disturber legacy CPEs, and pre-process the line errors by determining a difference between every two adjacent SYNC symbol errors corresponding to a same pilot sequence bit and every two adjacent data symbols corresponding to the same pilot sequence bit for a channel of the victim vector-compliant CPE.

In Example 7, the subject matter of one or any combination of Examples 1-6 optionally includes the line errors including decoding errors of the victim vector-compliant CPE.

In Example 8, the subject matter of one or any combination of Examples 1-7 optionally includes the line errors including Fast Fourier transform (FFT) outputs of the victim vector-compliant CPE.

Example 9 includes subject matter (such as computer-implemented method of assessing far-end channel crosstalk in digital subscriber line (DSL) communications), or can optionally be combined with the subject matter of one or any combination of Examples 1-8 to include such subject matter, comprising: transmitting a predetermined set of orthogonal pilot sequences from a DSL network device to one or more disturber vector-compliant consumer premises equipment (CPE); transmitting data symbols corresponding to the predetermined set of orthogonal pilot sequences from the DSL network device to one or more disturber legacy CPEs; pre-processing, at the DSL network device, line errors of a victim vector-compliant CPE channel due to the transmitting of the predetermined set of orthogonal pilot sequences to remove the far-end crosstalk due to the vector compliant disturber lines and performing the same pre-processing for the transmitted data symbols; determining far-end channel crosstalk information between network device ports connected to the one or more disturber legacy CPEs and network device ports connected to the victim vector-compliant CPE using a correlation of the pre-processed line errors and the pre-processed transmitted data symbols; and reducing far-end channel crosstalk at the victim vector-compliant CPE using the determined far-end channel crosstalk information.

In Example 10, the subject matter of Example 9 optionally includes pre-coding subsequent signals transmit via the one or more first vector-compliant CPEs using an inverse of the determined far-end channel crosstalk information.

In Example 11, the subject matter of one or both of Examples 9 and 10 optionally includes transmitting a pilot sequence of all ones to all vector-compliant CPEs and transmitting data symbols corresponding to the pilot sequence of all ones to all legacy CPEs, and wherein the pre-processing the line errors includes determining a difference between every two adjacent synchronization (SYNC) symbol errors and every two adjacent data symbols for a channel of the victim vector-compliant CPE.

In Example 12, the subject matter of one or any combination of Examples 9-11 optionally includes transmitting a pilot sequence of alternating ones and zeros to all vector-compliant CPEs and transmitting data symbols corresponding to the pilot sequence of alternating ones and zeros to all legacy CPEs, and wherein pre-processing line errors includes determining a sum between every two adjacent SYNC symbol errors and every two adjacent data symbols for a channel of the vector-compliant CPE.

In Example 13, the subject matter of one or any combination of Examples 9-12 optionally includes transmitting a specified pilot sequence twice in succession to the disturber vector-compliant CPEs and transmitting data symbols corresponding to the specified pilot sequence twice in succession to the disturber legacy CPEs, and wherein pre-processing line errors includes determining a difference between SYNC symbol errors corresponding to the two instances of the pilot sequence and data symbols corresponding to the two instances of the pilot sequence for a channel of the vector-compliant CPE.

In Example 14, the subject matter of one or any combination of Examples 9-13 optionally includes transmitting each bit of a specified pilot sequence twice in succession and transmitting data symbols corresponding each bit of the specified pilot sequence twice in succession to all legacy CPEs, and wherein pre-processing line errors includes determining a difference between every two adjacent SYNC symbol errors corresponding to a same pilot sequence bit, and every two adjacent data symbols corresponding to the same pilot sequence bit for a channel of the victim vector-compliant CPE.

In Example 15, the subject matter of one or any combination of Examples 9-14 optionally includes pre-processing line errors that include decoding errors of the victim vector-compliant CPE.

In Example 16, the subject matter of one or any combination of Examples 9-15 optionally includes pre-processing line errors that include Fast Fourier transform (FFT) outputs of the victim vector-compliant CPE.

Example 17 can include subject matter (such as a system), or can optionally be combined with the subject matter of one or any combination of Examples 1-16 to include such subject matter, comprising: a plurality of digital subscriber line (DSL) communication lines configured to communicate with consumer premises equipment (CPE); and a DSL network device operatively coupled to the plurality of DSL communication lines. The DSL network device includes: multiplexing circuitry configured to transmit signals to vector-compliant consumer premises equipment (CPE) and legacy CPE via the DSL communication lines; and processing circuitry configured to: initiate transmission of a predetermined set of orthogonal pilot sequences to one or more disturber vector-compliant CPEs; initiate transmission of data symbols corresponding to the set of orthogonal pilot sequences to one or more disturber legacy CPEs; pre-process line errors of a victim vector-compliant CPE channel, due to the transmitting of the predetermined set of orthogonal pilot sequences, to remove the far-end crosstalk due to the vector compliant disturber lines and perform the same pre-processing for the transmitted data symbols; determine far-end channel crosstalk information between network device ports connected to the one or more disturber legacy CPEs and a network device port connected to the victim vector-compliant CPE using a correlation of the pre-processed line errors and the pre-processed transmitted data symbols; and reduce far-end crosstalk of the victim vector-compliant CPE using the determined far-end channel crosstalk information.

In Example 18, the subject matter of Example 17 optionally includes processing circuitry configured to transmit a pilot sequence of all ones to all vector-compliant CPEs and transmit data symbols corresponding to the pilot sequence of all ones to all legacy CPEs, and pre-process the line errors by determining a difference between every two adjacent synchronization (SYNC) symbol errors and every two adjacent data symbols for the channel of the victim vector-compliant CPE.

In Example 19, the subject matter of one or both of Examples 17 and 18 optionally includes processing circuitry configured to transmit a pilot sequence of alternating ones and zeros to the disturber vector-compliant CPEs and transmit data symbols corresponding to the pilot sequence of alternating ones and zeros to the disturber legacy CPEs, and pre-process the line errors by determining a sum between every two adjacent SYNC symbol errors and every two adjacent data symbols for the channel of the victim vector-compliant CPE.

In Example 20, the subject matter of one or any combination of Examples 17-19 optionally includes processing circuitry configured to transmit a specified pilot sequence twice in succession to the disturber vector-compliant CPEs and transmit data symbols corresponding to the specified pilot sequence twice in succession to the disturber legacy CPEs, and pre-process the line errors by determining a difference between SYNC symbol errors corresponding to the two instances of the pilot sequence and data symbols corresponding to the two instances of the pilot sequence for the channel of the vector-compliant CPE.

In Example 21, the subject matter of one or any combination of Examples 17-20 optionally includes processing circuitry configured to transmit each bit of a specified pilot sequence twice in succession to the disturber vector-compliant CPEs and transmit data symbols corresponding each bit of the specified pilot sequence twice in succession to the disturber legacy CPEs, and pre-process the line errors by determining a difference between every two adjacent SYNC symbol errors corresponding to a same pilot sequence bit and every two adjacent data symbols corresponding to the same pilot sequence bit for the channel of the victim vector-compliant CPE.

In Example 22, the subject matter of one or any combination of Examples 17-21 optionally includes processing circuitry configured to pre-code subsequent signals transmit via the one or more vector-compliant CPEs using an inverse of a far-end channel crosstalk signal.

These non-limiting examples can be combined in any permutation or combination.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figure 2:
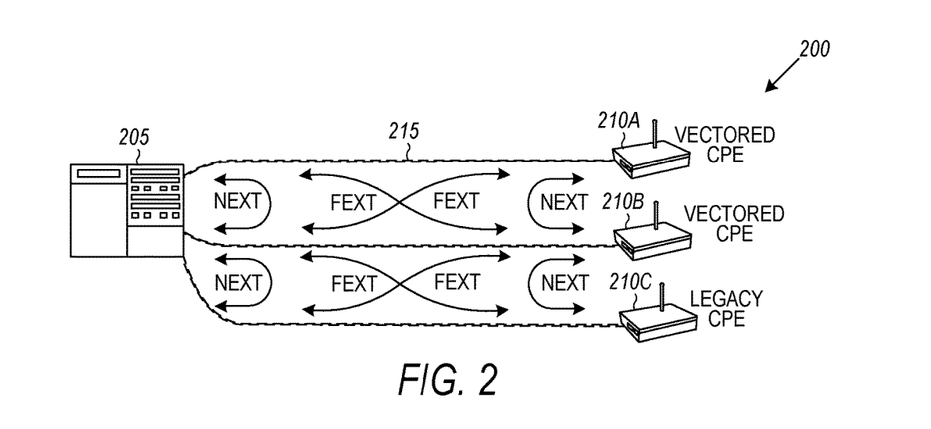
FIG. 2 is a diagram of portions of an example of a DSL network according to an example embodiment.

FIG. 2 is a diagram of portions of an example of a DSL network 200. A router 205 routes signals to CPEs (210A, 210B, 210C) over phone lines 215 that include copper twisted pair. As explained previously, bandwidth of DSL technology is limited due to crosstalk at the higher frequencies between multiple copper lines in telephone line bundles. High speed DSL (e.g., very high bit-rate DSL, or VDSL, VDSL2) includes even higher frequencies that can increase cross talk between telephone line pairs. There are two components of the crosstalk in DSL systems; near-end crosstalk (NEXT), and far-end crosstalk (FEXT). In NEXT, transmitting signals from a disturber line causes crosstalk interference on a victim line at the near end or receiving end of the transmitting device, such as near the router 205 or near the CPEs. In FEXT, transmitting signals on a disturber line causes crosstalk interference on a victim line and the crosstalk interference is transmit by the disturber line to the far end of the victim line (e.g., interference from the router end of a disturber line is transmitted to the CPE on the victim line).

Vectoring technology can reduce crosstalk between phone lines in DSL. Vectoring refers to performing FEXT cancellation between phone line pairs in multi-pair bundles. Vectoring technology is included in vector compliant CPEs such as CPEs 210A, 210B in FIG. 2. To estimate crosstalk from vectored disturber lines onto a vectored victim line, different specified orthogonal pilot sequences are modulated onto the synchronization (SYNC) symbols of each vectored disturber line. A vectored disturber line is a phone line pair connected to a vector-compliant CPE which causes crosstalk on the vectored victim line. Errors fed back from a vectored victim line are correlated with the known pilot sequences to estimate the corresponding FEXT of the vectored channels.

The example of FIG. 2 also shows that a DSL network may include a legacy CPE 210C that is not vector compliant. FEXT from legacy lines to vectored lines cannot be estimated using the vectored approach because a legacy CPE would drop the DSL connection if a pilot sequence is modulated on its SYNC symbols. Yet without estimating and canceling FEXT caused by legacy CPEs, the performance on a vectored line will be impacted and bandwidth of the DSL system will be reduced. In some cases the data rate could become as low as a system without vectoring technology. To address FEXT from a legacy CPE, symbols transmitted on the legacy line are stored and correlated with errors fed back on the vectored victim line to estimate the FEXT on the vectored victim line from the legacy line.

Figures 3, 4:
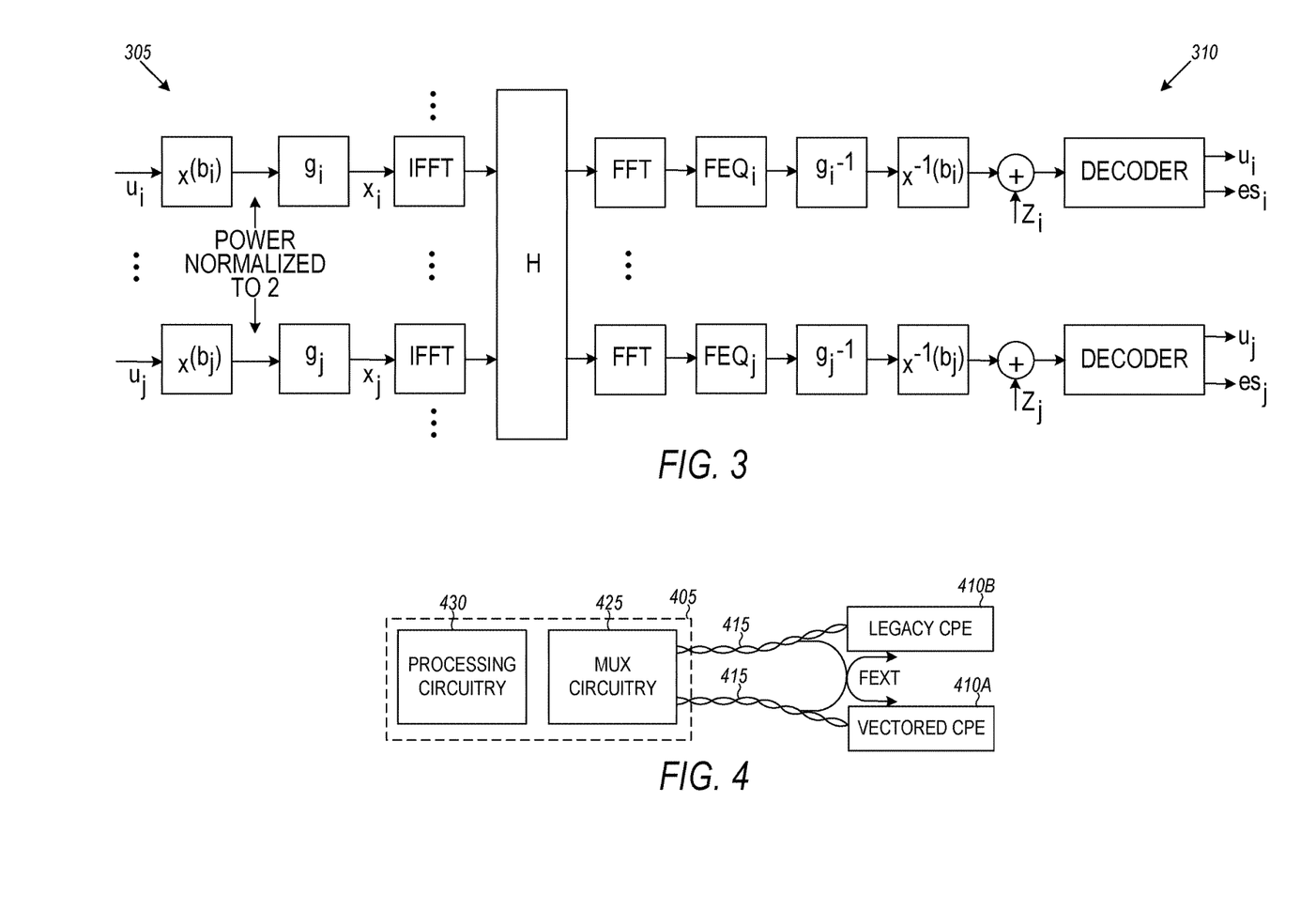
FIG. 3 is a block diagram of a channel model for a transmission channel from the central office (CO) of a DSL network to a CPE according to an example embodiment.
FIG. 4 is a simplified diagram of a portions of a DSL network according to an example embodiment.

FIG. 3 is a block diagram of a channel model for transmissions in the downstream direction from the central office (CO) of a DSL network to a CPE. Block H represents the transfer function of the channel medium. In the transmitter CO side 305, the constellation point $u_i$ is normalized by a factor $\chi(b_i)$ (assume $\chi(b_i=2)=1$) to make the average power to be 2, and adjusted by a gain factor $g_i$ (this could include tssi and power control factor $c_i$), then passed to the inverse Fast Fourier transform (IFFT) module. In the receiver CPE side 310, the Fast Fourier transform (FFT) is first taken to convert the received signal into the frequency domain, frequency equalization (FEQ) is applied to equalize the channel (assume $FEQ_i=h_{ii}^{-1}$), and then scaling factors $g_i^{-1}$ and $\chi^{-1}(b_i)$ are applied to recover the constellation point. To include background noise in the channel model, an equivalent background noise $z_i$ is added before the decoder.

Based on the channel model described, the error signal from a vectored line's sync symbol for a given tone or subcarrier can be represented as $$e_{ik} = \frac{1}{g_i}\sum_{j=1}^{N} h_{ij}x_{jk} + z_{ik} - u_{ik} = \frac{1}{g_i}\sum_{j=1,j\ne i}^{N} h_{ij}x_{jk} + z_{ik}$$

where i is the victim line index, j is the disturber line index, k is the sync symbol number index, N is the total number of lines in the vector group, $h_{ij}$ is the FEQ normalized channel response from line j to line i with $h_{ii}=1$, and $z_{ik}$ is the background noise.

For a vectored system, assume the first $N_1$ lines are vectored lines and the remaining $N_2$ lines are legacy lines, and $N_1+N_2=N$. All the vectored lines are aligned at the SYNC symbol positions, while the legacy lines have data symbols aligned with the SYNC symbols of the vectored lines.

For vectored lines to vectored lines channel estimation, different orthogonal pilot sequences are modulated onto the SYNC symbols for each vectored disturber line. The errors fed back from a vectored victim line are correlated with the known pilot sequences to estimate the corresponding FEXT channels.

The channel estimation at a given tone or subcarrier for a vectored disturber line j to a vectored victim line i with an orthogonal pilot sequence of length M is shown as below:

$$\hat{h}_{ij} = \frac{g_i}{2Mg_j} \sum_{k=1}^{M} e_{ik} w_{jk}^*$$

where, $w_{jk}^*$ is the complex conjugate of the pilot sequence at sync symbol number k for line j. The pilot sequence is assumed to have power equal to 2. This equation can be further expressed as $$\hat{h}_{ij} = \frac{g_i}{2Mg_j} \sum_{k=1}^{M} \left( \frac{1}{g_i} \sum_{l=1, l \neq i}^{N} h_{il} x_{lk} + z_{ik} \right) w_{jk}^*$$

$$= \frac{1}{2Mg_j} \sum_{l=1, l \neq i}^{N_1} h_{il} \sum_{k=1}^{M} x_{lk} w_{jk}^* +$$

$$\frac{g_i}{2Mg_j} \sum_{k=1}^{M} \left( \frac{1}{g_i} \sum_{l=N_1+1}^{N} h_{il} x_{lk} \right) w_{jk}^* + \frac{g_i}{2Mg_j} \sum_{k=1}^{M} z_{ik} w_{jk}^*$$

where, the first term corresponds to the vectored disturber lines.

Using the orthogonal property of the pilot sequence, we have $$\sum_{k=1}^{M} x_{lk} w_{jk}^* = \begin{cases} 2Mg_j & \text{for } l = j \\ 0 & \text{else} \end{cases}$$

and the first term becomes $h_{ij}$. The second term corresponds to the legacy disturber lines. The term $\Sigma_{l=N_1+1}^{N} h_{il} x_{lk}$ corresponds to the total crosstalk from all legacy lines at symbol k for victim line i. The third term corresponds to background noise.

For legacy lines to vectored lines channel estimation, the transmitted data symbols for a legacy disturber line are correlated with the errors fed back from a vectored victim line, to estimate the corresponding FEXT channels.

The channel estimation at a given tone or subcarrier for a legacy disturber line j to a vectored victim line i using M data symbols can be determined using the following correlation:

$$\hat{h}_{ij} = \frac{g_i}{P_{xj}} \sum_{k=1}^{M} e_{ik} x_{jk}^* \text{ with } P_{xj} = \sum_{k=1}^{M} x_{jk} x_{jk}^*$$

where $x_{jk}^*$ is the complex conjugate of the IFFT input at the data symbol corresponding to vectored lines' sync symbol number k for legacy line j.

The above equation can be re-written as $$\hat{h}_{ij} = \frac{g_i}{P_{xj}} \sum_{k=1}^{M} \left( \frac{1}{g_i} \sum_{l=1, l \neq i}^{N} h_{il} x_{lk} + z_{ik} \right) x_{jk}^*$$

$$= \frac{h_{ij}}{P_{xj}} \sum_{k=1}^{M} x_{jk} x_{jk}^* + \frac{g_i}{P_{xj}} \sum_{k=1}^{M} \left( \frac{1}{g_i} \sum_{\substack{l=1 \\ l \neq i, l \neq j}}^{N} h_{il} x_{lk} \right) x_{jk}^* + \frac{g_i}{P_{xj}} \sum_{k=1}^{M} z_{ik} x_{jk}^*$$

$$= h_{ij} + \frac{g_i}{P_{xj}} \sum_{k=1}^{M} \left( \frac{1}{g_i} \sum_{\substack{l=1 \\ l \neq i}}^{N_1} h_{il} x_{lk} \right) x_{jk}^* +$$

$$\frac{g_i}{P_{xj}} \sum_{k=1}^{M} \left( \frac{1}{g_i} \sum_{\substack{l=N_1+1 \\ l \neq j}}^{N} h_{il} x_{lk} \right) x_{jk}^* + \frac{g_i}{P_{xj}} \sum_{k=1}^{M} z_{ik} x_{jk}^*$$

where the first term is the required value $h_{ij}$, the second term is for all the vectored disturber lines, the third term is for all the other legacy disturber lines, and the last term is for the background noise.

Therefore, when the FEXT from a legacy disturber line to a vectored victim line is estimated using this method, there are three noise sources affecting the channel FEXT estimation accuracy: 1) background noise in the victim line, 2) FEXT from all vectored disturber lines to the vectored victim line; and 3) FEXT from all other legacy disturber lines to the vectored victim line. When the FEXT from the vectored and legacy disturber lines is known or estimated, subsequent signals transmitted via the vectored lines can be pre-coded with a compensation factor to cancel the interference and thereby reduce the FEXT from disturber lines being received by victim CPEs.

FIG. 4 is a diagram of an example of a portion of a DSL network that includes a DSL network device 405 connected to a vectored CPE 410A and a legacy CPE 410B using DSL communication lines 415 (e.g., bundled phone lines). The DSL network device 405 may be a DSL router located at the CO. The DSL network device 405 includes multiplexing circuitry 420 to transmit signals to vectored CPE and legacy CPE via the DSL communication lines. In some embodiments, the DSL network device 405 is a DSL access multiplexer (DSLAM) device. The DSL network device 405 also includes processing circuitry 430. The processing circuitry 430 may include a baseband processor to determine orthogonal pilot sequences and modulate the pilot sequences onto the SYNC symbols. When the estimate of the FEXT for the vectored victim line is determined by the processing circuitry 430, subsequent transmissions on the vectored channels can include signal components determined using the extracted far-end crosstalk information (e.g., pre-coded with the inverse of the estimated FEXT) to cancel the far-end crosstalk on the victim vectored line.

To estimate FEXT from a vectored disturber line, different predetermined orthogonal pilot sequences are modulated onto the SYNC symbols for each vectored disturber line. The error signals fed back from the vectored victim line are correlated with the predetermined orthogonal pilot sequences to estimate the FEXT from the vectored disturber lines.

To estimate FEXT from a legacy disturber line, pre-processing is performed to reduce or remove the contribution of FEXT from the vectored disturber lines in the $e_{ik}$ portion of the equations above. The pre-processed $e_{ik}$ is correlated with pre-processed $x_{jk}^*$ to estimate the FEXT on the vectored victim line. With the pre-processing, the FEXT from all vectored disturber lines will not have an effect on the legacy FEXT estimation, and the contribution due to the legacy disturber lines can be estimated.

Figure 5:
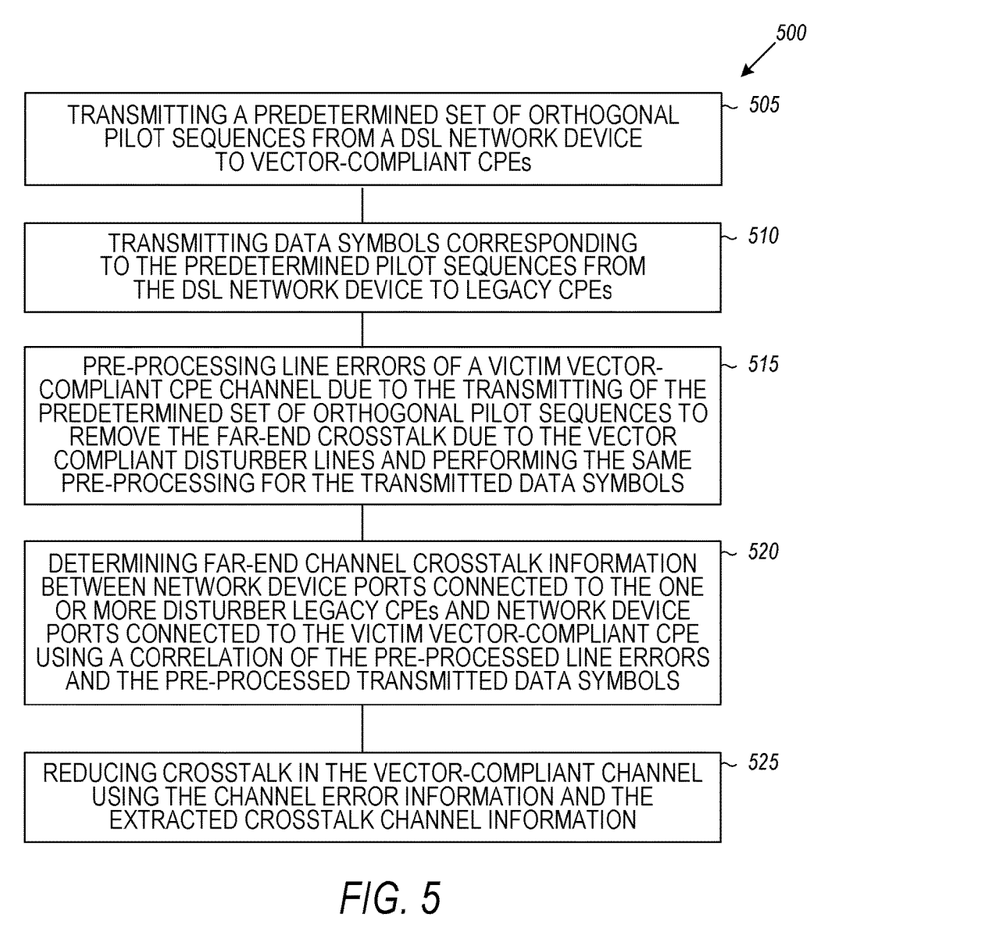
FIG. 5 is a flow diagram of an embodiment of a method to assess crosstalk in DSL communications according to an example embodiment.

FIG. 5 is a flow diagram of an embodiment of a method 500 to assess far-end crosstalk in DSL communications originating from legacy CPEs. At 505, a predetermined set of orthogonal pilot sequences is transmitted from a DSL network device (e.g., the DSL network device 405 of FIG. 4) to disturber vector-compliant CPEs. In some embodiments, the predetermined set of orthogonal pilot sequences can be transmitted on all vectored lines.

At 510, data symbols corresponding to the predetermined set of orthogonal pilot sequences are transmitted from the DSL network device to one or more legacy CPEs. The predetermined orthogonal pilot sequences and the data symbols may be transmitted on the vector lines and legacy lines at the same time.

At 515, line errors for the channel of the victim vector-compliant CPE is received at the network device. The error information is generated from the transmission of the predetermined set of orthogonal pilot sequences and the corresponding data symbols. In some embodiments, the line errors could be decoding errors by the vector compliant CPE. In some embodiments, the line errors could be the FFT outputs of the vector compliant CPE receiver. The line errors are pre-processed to remove the far-end crosstalk due to the vector compliant disturber lines. The same pre-processing is performed for the transmitted data symbols At 520, crosstalk channel information between network device ports connected to the one or more legacy CPEs and network device ports connected to the vector-compliant CPE is extracted using a correlation determined using the transmitted data symbols and the channel error information. At 525, the crosstalk in the channel of the vector-compliant CPE using the channel error information and the extracted crosstalk channel information can be reduced by determining a compensation factor using the estimate of crosstalk on the channel (e.g., by transmitting the inverse of the estimate to cancel the crosstalk). The combined orthogonal pilot sequence estimation and the cross talk extraction using the correlation improves system performance when legacy CPEs are present because the crosstalk originating from legacy CPEs is included in the crosstalk estimate.

In some embodiments, the set of orthogonal elements can be selected so that only a very short pre-processing time is needed on the determined vectored victim line errors in order to remove the FEXT caused by all of the vectored disturber lines. The pre-processing can also be performed for the stored transmitted symbols for the legacy disturber lines to estimate the FEXT caused by all of the legacy disturber lines. Estimates of the FEXT can then be used to reduce the FEXT on the vectored victim line.

For example, to estimate the FEXT due to legacy disturber lines, a pilot sequence of all ones (i.e., 111111 . . . ) is transmitted on all vectored lines (e.g., to all vectored CPEs) of the DSL network. The errors on the SYNC symbols present on the vectored victim line are pre-processed by determining the difference between every two adjacent SYNC symbol errors. The corresponding transmitted data symbols for a legacy disturber are also pre-processed by taking the differences between every two adjacent symbols. The pre-processed errors and the pre-processed transmitted symbols are correlated to estimate the FEXT channel for the legacy disturber line.

The channel estimation for a legacy disturber line j to a vectored victim line i using M data symbols is shown as below:

$$\hat{h}_{ij} = \frac{g_i}{P_{xj}} \left\{ \sum_{(k=1,k\ odd)}^{(M,M\ even)} [(e_{i(k+1)} - e_{ik}) \times (x_{j(k+1)}^* - x_{jk}^*)] \right\}$$

$$P_{xj} = \sum_{(k=1,k\ odd)}^{(M,M\ even)} [(x_{j(k+1)} - x_{jk}) \times (x_{j(k+1)}^* - x_{jk}^*)]$$

$$= \sum_{(k=1,k\ odd)}^{(M,M\ even)} |x_{j(k+1)} - x_{jk}|^2$$

This equation can be further expressed as $$\hat{h}_{ij} = \frac{g_i}{P_{xj}} \sum_{(k=1,k\ odd)}^{(M,M\ even)} \left\{ \left[ \frac{1}{g_i} \sum_{l=1,l\neq i}^{N} h_{il}(x_{l(k+1)} - x_{lk}) \right] + (z_{i(k+1)} - z_{ik}) \right\} \times$$

$$(x_{j(k+1)}^* - x_{jk}^*)$$

$$= \frac{g_i}{P_{xj}} \times \left\{ \frac{1}{g_i} \times h_{ij} \times \sum_{(k=1,k\ odd)}^{(M,M\ even)} (x_{j(k+1)} - x_{jk}) \times (x_{j(k+1)}^* - x_{jk}^*) \right\} +$$

$$\frac{g_i}{P_{xj}} \times \left\{ \frac{1}{g_i} \sum_{\substack{l=1,l\neq j \\ (l\ vectored\ line)}}^{N} h_{il} \sum_{(k=1,k\ odd)}^{(M,M\ even)} (x_{l(k+1)} - x_{lk}) \times (x_{j(k+1)}^* - x_{jk}^*) \right\} +$$

$$\frac{g_i}{P_{xj}} \times \left\{ \frac{1}{g_i} \sum_{\substack{l=1,l\neq j \\ (l\ legacy\ line)}}^{N} h_{il} \sum_{(k=1,k\ odd)}^{(M,M\ even)} (x_{l(k+1)} - x_{lk}) \times (x_{j(k+1)}^* - x_{jk}^*) \right\} +$$

$$\frac{g_i}{P_{xj}} \times \left\{ \sum_{(k=1,k\ odd)}^{(M,M\ even)} (z_{i(k+1)} - z_{ik}) \times (x_{j(k+1)}^* - x_{jk}^*) \right\}$$

The first term corresponds to the required value, its expected value is $h_{ij}$. The second term is for the vectored disturber lines, it is zero since $x_{l(k+1)} = x_{lk}$ for any vectored line l. The third term is for all the other legacy disturber lines, it can be shown to a mean value of zero. The last term is for background noise, it also has zero mean. Therefore, the FEXT on the vectored victim line from all the vectored disturber lines has no effect on the legacy disturber line to vectored victim line estimation.

In another embodiment, to estimate the FEXT due to legacy disturber lines, a pilot sequence of alternating ones and zeros (i.e., 101010 . . . ) is transmitted on all vectored lines of the DSL network. The errors on the SYNC symbols present on the vectored victim line are pre-processed by determining the sum between every two adjacent SYNC symbol errors. The corresponding transmitted data symbols for a legacy disturber are also pre-processed by determining the sum between every two adjacent symbols. The pre-processed errors and the pre-processed transmitted symbols are correlated to estimate the FEXT caused by the legacy disturber line.

The channel estimation for a legacy disturber line j to a vectored victim line i using M data symbols is shown as below:

$$\hat{h}_{ij} = \frac{g_i}{P_{xj}} \left\{ \sum_{(k=1, k \text{ odd})}^{(M, M\_even)} [(e_{i(k+1)} + e_{ik}) \times (x^*_{j(k+1)} + x^*_{jk})] \right\}$$

$$P_{xj} = \sum_{(k=1, k \text{ odd})}^{(M, M\_even)} [(x_{j(k+1)} + x_{jk}) \times (x^*_{j(k+1)} + x^*_{jk})]$$

$$= \sum_{(k=1, k \text{ odd})}^{(M, M\_even)} |x_{j(k+1)} + x_{jk}|^2$$

It can be shown that the effects from all vectored disturber lines are removed in the estimated channel since $x_{l(k+1)} = -x_{lk}$ for any vectored line l. Like the previous embodiment, the same pilot sequences can be used to estimate the FEXT from vectored disturber lines to vectored victim lines for this embodiment.

Figure 6:
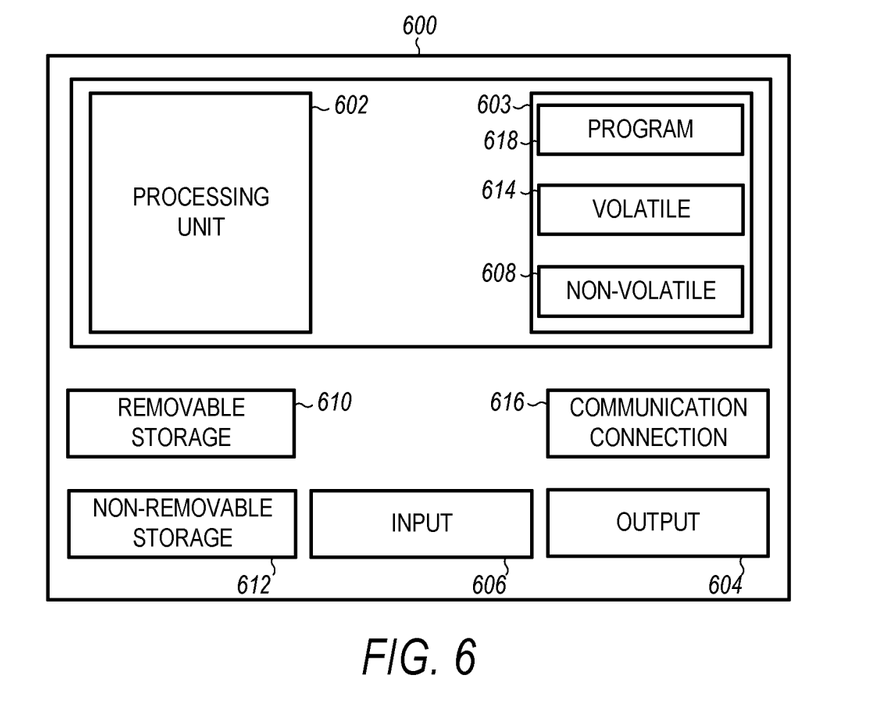
FIG. 6 is a block diagram illustrating circuitry for clients, servers, cloud based resources for implementing algorithms and performing methods according to example embodiments.

FIG. 6 is a block diagram illustrating circuitry for performing methods to assess crosstalk in DSL communications according to example embodiments. One example DSL network device in the form of a computer 600 may include a processing unit 602, memory 603, removable storage 610, and non-removable storage 612. All components need not be used in various embodiments. For example, different network devices may each use a different set of components. Although the example computing device is illustrated and described as computer 600, the computing device may be in different forms in different embodiments. Although the various data storage elements are illustrated as part of the computer 600, the storage may also or alternatively include cloud-based storage accessible via a network, such as the Internet or server based storage.

Memory 603 may include volatile memory 614 and/or non-volatile memory 608. Computer 600 may include—or have access to a computing environment that includes—a variety of computer-readable media, such as volatile memory 614, non-volatile memory 608, removable storage 610 and/or non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input 606, output 604, and a communication connection 616. Output 604 may include a display device. The input 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common network node, or the like. The communication connection may include a CPE connected to the computer using telephone lines or fiber optics.

Computer-readable instructions stored on a computer-readable medium are executable by the processing unit 602 of the computer 600. A hard drive, CD-ROM, and RAM are It can be shown that the effects from all vectored disturber lines are removed in the estimated channel since $x_{l(k+1)} = -x_{lk}$ for any vectored line l.

In another embodiment, to estimate the FEXT due to legacy disturber lines, orthogonal pilot sequences are transmitted on all vectored lines, but the pilot sequence for each vectored line is sent twice. The errors on the SYNC symbols from the vectored victim CPE are pre-processed by taking the difference between the two SYNC symbol errors corresponding to the two instances of the pilot sequence. The corresponding transmitted data symbols for a legacy disturber are also pre-processed by taking the difference between every two corresponding symbols. The pre-processed errors and the pre-processed transmitted symbols are correlated to estimate the FEXT channel for the legacy disturber line.

The channel estimation for a legacy disturber line j to a vectored victim line i using M data symbols (pilot sequence length is M/2) is shown as below:

$$\hat{h}_{ij} = \frac{g_i}{P_{xj}} \left\{ \sum_{k=1}^{(M/2, M\_even)} [(e_{i(k+M/2)} - e_{ik}) \times (x^*_{j(k+M/2)} - x^*_{jk})] \right\}$$

$$P_{xj} = \sum_{k=1}^{(M/2, M\_even)} [(x_{j(k+M/2)} - x_{jk}) \times (x^*_{j(k+M/2)} - x^*_{jk})]$$

$$= \sum_{k=1}^{(M/2, M\_even)} |x_{j(k+M/2)} - x_{jk}|^2$$

It can be shown that the effects from all vectored disturber lines are removed in the estimated channel since $x_{l(k+M/2)} = x_{lk}$ for any vectored line l. An advantage of this embodiment is that the same pilot sequences can be used to estimate the FEXT from vectored disturber lines to vectored victim lines.

In still another embodiment, to estimate the FEXT due to legacy disturber lines, orthogonal pilot sequences are transmitted on all vectored lines, but each bit of the pilot sequence for each vectored line is immediately sent twice (e.g., if the pilot sequence is 1011, then 11001111 is transmitted). The errors on the SYNC symbols from the vectored victim line are pre-processed by taking the differences between every two adjacent SYNC symbol errors corresponding to the same pilot sequence bit. The corresponding transmitted data symbols for a legacy disturber are also pre-processed by taking the difference between every two corresponding symbols. The pre-processed errors and the pre-processed transmitted symbols are correlated to estimate the FEXT channel for the legacy disturber line.

The channel estimation for a legacy disturber line j to a vectored victim line i using M data symbols (pilot sequence length is M/2) is shown as below:

some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 620.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

Some embodiments pertain to computer-readable non-transitory media. The computer-readable non-transitory media includes all types of computer readable media, including magnetic storage media, optical storage media, flash media and solid state storage media.

It should be understood that software can be installed in and sold with the DSL network device. Alternatively the software can be obtained and loaded into the DSL network device, including obtaining the software through physical medium or distribution system, including, for example, from a server owned by the software creator or from a server not owned but used by the software creator. The software can be stored on a server for distribution over the Internet, for example.

What is claimed is:

1. A digital subscriber line (DSL) network device for coupling to DSL communication lines, the DSL network device comprising:
    multiplexing circuitry configured to transmit signals to vector-compliant consumer premises equipment (CPE) and legacy CPE via the DSL communication lines; and
    processing circuitry configured to:
    initiate transmission of a predetermined set of orthogonal pilot sequences to one or more disturber vector-compliant CPEs;
    initiate transmission of data symbols corresponding to the predetermined set of orthogonal pilot sequences to one or more disturber legacy CPEs;
    pre-process line errors of a victim vector-compliant CPE, due to the transmitting of the predetermined set of orthogonal pilot sequences, to remove far-end crosstalk due to the vector compliant disturber lines and perform the same pre-processing for the transmitted data symbols;
    determine far-end channel crosstalk information between network device ports connected to the one or more disturber legacy CPEs and a network device port connected to the victim vector-compliant CPE using a correlation of the pre-processed line errors and the pre-processed transmitted data symbols; and
    pre-code subsequent signals transmitted by the DSL network device via the vectored lines with a compensation factor, the compensation factor determined using the far-end channel crosstalk information, and applied to reduce far-end channel crosstalk of the victim vector-compliant CPE.

2. The DSL network device of claim 1, wherein the processing circuitry is configured to pre-code the subsequent signals to transmit via the one or more disturber vector-compliant CPEs using an inverse of an estimated far-end channel crosstalk signal.

3. The DSL network device of claim 1, wherein the processing circuitry is configured to transmit a pilot sequence of all ones to all vector-compliant CPEs and transmitting data symbols corresponding to the pilot sequence of all ones to all legacy CPEs, and pre-process the line errors by determining a difference between every two adjacent synchronization (SYNC) symbol errors and every two adjacent data symbols for a channel of the victim vector-compliant CPE.

4. The DSL network device of claim 1, wherein the processing circuitry is configured to transmit a pilot sequence of alternating ones and zeros to all vector-compliant CPEs and transmit data symbols corresponding to the pilot sequence of alternating ones and zeros to all legacy CPEs, and pre-process the line errors by determining a sum between every two adjacent SYNC symbol errors and every two adjacent data symbols for a channel of the victim vector-compliant CPE.

5. The DSL network device of claim 1, wherein the processing circuitry is configured to transmit a specified pilot sequence twice in succession to the disturber vector-compliant CPEs and transmit data symbols corresponding to the specified pilot sequence twice in succession to the disturber legacy CPEs, and pre-process the line errors by determining a difference between every two SYNC symbol errors corresponding to the two instances of the pilot sequence and data symbols corresponding to the two instances of the pilot sequence for a channel of the victim vector-compliant CPE.

6. The DSL network device of claim 1, wherein the processing circuitry is configured to transmit each bit of a specified pilot sequence twice in succession to the disturber vector-compliant CPEs and transmit data symbols corresponding to each bit of the specified pilot sequence twice in succession to the disturber legacy CPEs, and pre-process the line errors by determining a difference between every two adjacent SYNC symbol errors corresponding to a same pilot sequence bit and every two adjacent data symbols corresponding to the same pilot sequence bit for a channel of the victim vector-compliant CPE.

7. The DSL network device of claim 1, wherein the line errors include decoding errors of the victim vector-compliant CPE.

8. The DSL network device of claim 1, wherein the line errors include Fast Fourier transform (FFT) outputs of the victim vector-compliant CPE.

9. A computer-implemented method of assessing far-end channel crosstalk in digital subscriber line (DSL) communications, the method comprising:
    transmitting a predetermined set of orthogonal pilot sequences from a DSL network device to one or more disturber vector-compliant consumer premises equipment (CPE);
    transmitting data symbols corresponding to the predetermined set of orthogonal pilot sequences from the DSL network device to one or more disturber legacy CPEs;
    pre-processing, at the DSL network device, line errors of a victim vector-compliant CPE due to the transmitting of the predetermined set of orthogonal pilot sequences to remove far-end crosstalk due to the vector compliant disturber lines and performing the same pre-processing for the transmitted data symbols;
    determining far-end channel crosstalk information between network device ports connected to the one or more disturber legacy CPEs and network device ports connected to the victim vector-compliant CPE using a correlation of the pre-processed line errors and the pre-processed transmitted data symbols; and reducing far-end channel crosstalk of the victim vector-compliant CPE, by pre-coding subsequent signals transmitted by the DSL network device via the vectored lines with a compensation factor determined using the determined far-end channel crosstalk information.

10. The method of claim 9, wherein the reducing far-end channel crosstalk of the victim vector-compliant CPE includes pre-coding the subsequent signals for transmitting via the one or more first vector-compliant CPEs using an inverse of the determined far-end channel crosstalk information.

11. The method of claim 9, wherein transmitting a predetermined set of orthogonal pilot sequences includes transmitting a pilot sequence of all ones to all vector-compliant CPEs and transmitting data symbols corresponding to the pilot sequence of all ones to all legacy CPEs, and wherein the pre-processing the line errors includes determining a difference between every two adjacent synchronization (SYNC) symbol errors and every two adjacent data symbols for a channel of the victim vector-compliant CPE.

12. The method of claim 9, wherein transmitting a predetermined set of orthogonal pilot sequences includes transmitting a pilot sequence of alternating ones and zeros to all vector-compliant CPEs and transmitting data symbols corresponding to the pilot sequence of alternating ones and zeros to all legacy CPEs, and wherein pre-processing line errors includes determining a sum between every two adjacent SYNC symbol errors and every two adjacent data symbols for a channel of the vector-compliant CPE.

13. The method of claim 9, wherein transmitting a predetermined set of orthogonal pilot sequences includes transmitting a specified pilot sequence twice in succession to the disturber vector-compliant CPEs and transmitting data symbols corresponding to the specified pilot sequence twice in succession to the disturber legacy CPEs, and wherein pre-processing line errors includes determining a difference between SYNC symbol errors corresponding to the two instances of the pilot sequence and data symbols corresponding to the two instances of the pilot sequence for a channel of the vector-compliant CPE.

14. The method of claim 9, wherein transmitting a predetermined set of orthogonal pilot sequences includes transmitting each bit of a specified pilot sequence twice in succession and transmitting data symbols corresponding to each bit of the specified pilot sequence twice in succession to all legacy CPEs, and wherein pre-processing line errors includes determining a difference between every two adjacent SYNC symbol errors corresponding to a same pilot sequence bit, and every two adjacent data symbols corresponding to the same pilot sequence bit for a channel of the victim vector-compliant CPE.

15. The method of claim 9, wherein the line errors include decoding errors of the victim vector-compliant CPE.

16. The method of claim 9, wherein the line errors include Fast Fourier transform (FFT) outputs of the victim vector-compliant CPE.

17. A system comprising:
a plurality of digital subscriber line (DSL) communication lines configured to communicate with consumer premises equipment (CPE); and
a DSL network device operatively coupled to the plurality of DSL communication lines, wherein the DSL network device includes:

multiplexing circuitry configured to transmit signals to vector-compliant consumer premises equipment (CPE) and legacy CPE via the DSL communication lines; and
processing circuitry configured to:
initiate transmission of a predetermined set of orthogonal pilot sequences to one or more disturber vector-compliant CPEs;
initiate transmission of data symbols corresponding to the predetermined set of orthogonal pilot sequences to one or more disturber legacy CPEs;
pre-process line errors of a victim vector-compliant CPE channel, due to the transmitting of the predetermined set of orthogonal pilot sequences, to remove the far-end crosstalk due to the vector compliant disturber lines and perform the same pre-processing for the transmitted data symbols;
determine far-end channel crosstalk information between network device ports connected to the one or more disturber legacy CPEs and a network device port connected to the victim vector-compliant CPE using a correlation of the pre-processed line errors and the pre-processed transmitted data symbols; and
pre-code subsequent signals transmitted by the DSL network device via the vectored lines with a compensation factor, determined using the far-end channel crosstalk information, to reduce far-end channel crosstalk of the victim vector-compliant CPE.

18. The system of claim 17, wherein the processing circuitry is configured to transmit a pilot sequence of all ones to all vector-compliant CPEs and transmit data symbols corresponding to the pilot sequence of all ones to all legacy CPEs, and pre-process the line errors by determining a difference between every two adjacent synchronization (SYNC) symbol errors and every two adjacent data symbols for a channel of the victim vector-compliant CPE.

19. The system of claim 17, wherein the processing circuitry is configured to transmit a pilot sequence of alternating ones and zeros to the disturber vector-compliant CPEs and transmit data symbols corresponding to the pilot sequence of alternating ones and zeros to the disturber legacy CPEs, and pre-process the line errors by determining a sum between every two adjacent SYNC symbol errors and every two adjacent data symbols for a channel of the victim vector-compliant CPE.

20. The system of claim 17, wherein the processing circuitry is configured to transmit a specified pilot sequence twice in succession to the disturber vector-compliant CPEs and transmit data symbols corresponding to the specified pilot sequence twice in succession to the disturber legacy CPEs, and pre-process the line errors by determining a difference between SYNC symbol errors corresponding to the two instances of the pilot sequence and data symbols corresponding to the two instances of the pilot sequence for a channel of the vector-compliant CPE.

21. The system of claim 17, wherein the processing circuitry is configured to transmit each bit of a specified pilot sequence twice in succession to the disturber vector-compliant CPEs and transmit data symbols corresponding to each bit of the specified pilot sequence twice in succession to the disturber legacy CPEs, and pre-process the line errors by determining a difference between every two adjacent SYNC symbol errors corresponding to a same pilot sequence bit and every two adjacent data symbols corresponding to the same pilot sequence bit for a channel of the victim vector-compliant CPE.

22. The system of claim 17, wherein the processing circuitry is configured to pre-code the subsequent signals transmit via the one or more vector-compliant CPEs using an inverse of a far-end channel crosstalk signal.

* * * * *